United States Patent [19]
Smith

[11] Patent Number: 5,926,218
[45] Date of Patent: Jul. 20, 1999

[54] ELECTRONIC CAMERA WITH DUAL RESOLUTION SENSORS

[75] Inventor: Stephen P. Smith, Victor, N.Y.

[73] Assignee: Eastman Kodak Company, Rochester, N.Y.

[21] Appl. No.: 08/658,973

[22] Filed: Jun. 4, 1996

[51] Int. Cl.$^6$ .................................................. H04N 5/225
[52] U.S. Cl. ........................ 348/358; 348/333; 348/335
[58] Field of Search ........................... 348/207, 64, 231, 348/240, 333, 335, 344, 358, 42, 47; H04N 5/225

[56] References Cited

U.S. PATENT DOCUMENTS

| | | | |
|---|---|---|---|
| 4,563,705 | 1/1986 | Oinoue et al. | 348/350 |
| 4,714,962 | 12/1987 | Levine | 358/209 |
| 4,827,347 | 5/1989 | Bell | 348/333 |
| 4,853,787 | 8/1989 | Kurth | 358/224 |
| 4,953,029 | 8/1990 | Morimoto | 348/221 |
| 4,963,981 | 10/1990 | Todaka et al. | 358/213.13 |
| 5,023,635 | 6/1991 | Nealon | 354/76 |
| 5,043,817 | 8/1991 | Kinugasa et al. | 358/213.13 |
| 5,130,814 | 7/1992 | Spencer | 358/335 |
| 5,150,215 | 9/1992 | Shi | 348/344 |
| 5,243,433 | 9/1993 | Hailey | 358/214 |
| 5,264,939 | 11/1993 | Chang | 348/322 |
| 5,333,055 | 7/1994 | Murata et al. | 348/239 |
| 5,339,105 | 8/1994 | Iura et al. | 348/240 |
| 5,398,062 | 3/1995 | Hashimoto et al. | 348/334 |
| 5,436,660 | 7/1995 | Sakamoto | 348/333 |
| 5,561,458 | 10/1996 | Cronin et al. | 348/64 |
| 5,619,260 | 4/1997 | Cronin et al. | 348/342 |
| 5,710,954 | 1/1998 | Inoue | 348/333 |

*Primary Examiner*—Tuan V. Ho
*Attorney, Agent, or Firm*—David M. Woods

[57] ABSTRACT

An electronic camera includes a low resolution image sensor responsive to image light for generating a low resolution output signal that is used for camera control functions, such as image viewing, and a high resolution image sensor responsive to image light for generating a high resolution output signal that is used to produce an output image signal. The camera further includes an electronic display driven by the output signal from the low resolution image sensor, a zoom lens for varying the size of the image incident upon the high resolution image sensor and a zoom interpolator responsive to a zoom setting of the zoom lens. The output signal from the low resolution image sensor is then applied to the zoom interpolator, which processes the output signal so that the size of a display image obtained from the low resolution signal corresponds to the zoom setting of the zoom lens.

19 Claims, 2 Drawing Sheets

ELECTRONIC CAMERA WITH DUAL RESOLUTION SENSORS

FIELD OF THE INVENTION

The invention relates generally to the field of photography, and in particular to an electronic camera having an electronic display, such as an electronic viewfinder.

BACKGROUND OF THE INVENTION

Electronic cameras usually require some type of viewfinder to preview a scene before image capture, and sometimes to review the captured image. The viewfinder typically provides a moving, or video-type, image. Because the video requirements are similar, electronic motion cameras typically use the same sensor for previewing an image, as for capturing the image. This leads to a relatively simple optical and image processing system. Electronic still cameras, particularly high resolution digital cameras, typically use an optical viewfinder for previewing an image because the imaging requirements are quite different. More specifically, the high resolution image is not immediately compatible with the video image required by the viewfinder.

Adding a zooming lens to a motion camera is a relatively simple matter, because the single optical zoom component equally affects the preview image and the captured image. However, a high resolution digital still camera with a zooming lens may become quite complex when a zooming viewfinder is required. Either an additional zoom mechanism is required for the optical viewfinder (unless the camera is a single lens reflex camera), or complicated algorithms have to be devised to extract the image in video-compatible format from the high resolution sensor at a high data rate.

Moreover, in addition to the viewfinder, a still camera requires accurate scene measurement over the actual capture field for both exposure and illuminant detection. This may also mean further components.

Consequently, it would be desirable to have a high resolution digital still camera that provides high resolution zooming of the primary image, while at the same time providing simple and cost effective zooming of the viewfinder image.

SUMMARY OF THE INVENTION

The present invention is directed to overcoming one or more of the problems set forth above. Briefly summarized, according to one aspect of the present invention, an electronic camera includes a first image sensor responsive to image light for generating a first output signal that is used for camera control functions, and a second image sensor responsive to image light for generating a second output signal that is used to produce an output image signal, wherein the second image sensor has a higher resolution than the first image sensor.

In a particular embodiment, the specific camera control function is image viewing and the camera further includes an electronic display. The first output signal from the first image sensor is then applied to the electronic display to generate a display image for image viewing. The camera may further include a zoom lens for varying the size of the image incident upon the second image sensor and a zoom interpolator responsive to a zoom setting of the zoom lens. The first output signal from the first image sensor is then applied to the zoom interpolator, which processes the first output signal so that the size of a display image obtained from the first output signal corresponds to the zoom setting of the zoom lens.

The advantage of the invention is that the high resolution imaging device is the only device using a high quality zoom lens, as well as the only imaging device that itself needs to be of the highest resolution and quality. The optical viewfinder is replaced by a low cost, low resolution "video" type imager that can image through a different lower cost lens. Moreover, this lens can be a simple non-zooming lens, and viewfinder zooming can accomplished by a relatively simple conventional algorithm that operates upon the low resolution signal from the video imager. In addition, the video imager may serve as a scene measurement device (photometer, illuminant detector, etc.) as well as a live electronic viewfinder.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because electronic cameras employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system description as described in the following materials, all such software implementation is conventional and within the ordinary skill in such arts. Furthermore, the circuits driving the sensors, and the clock signals utilized therewith, are conventional and may be obtained from well known materials and sources.

Figure 1:
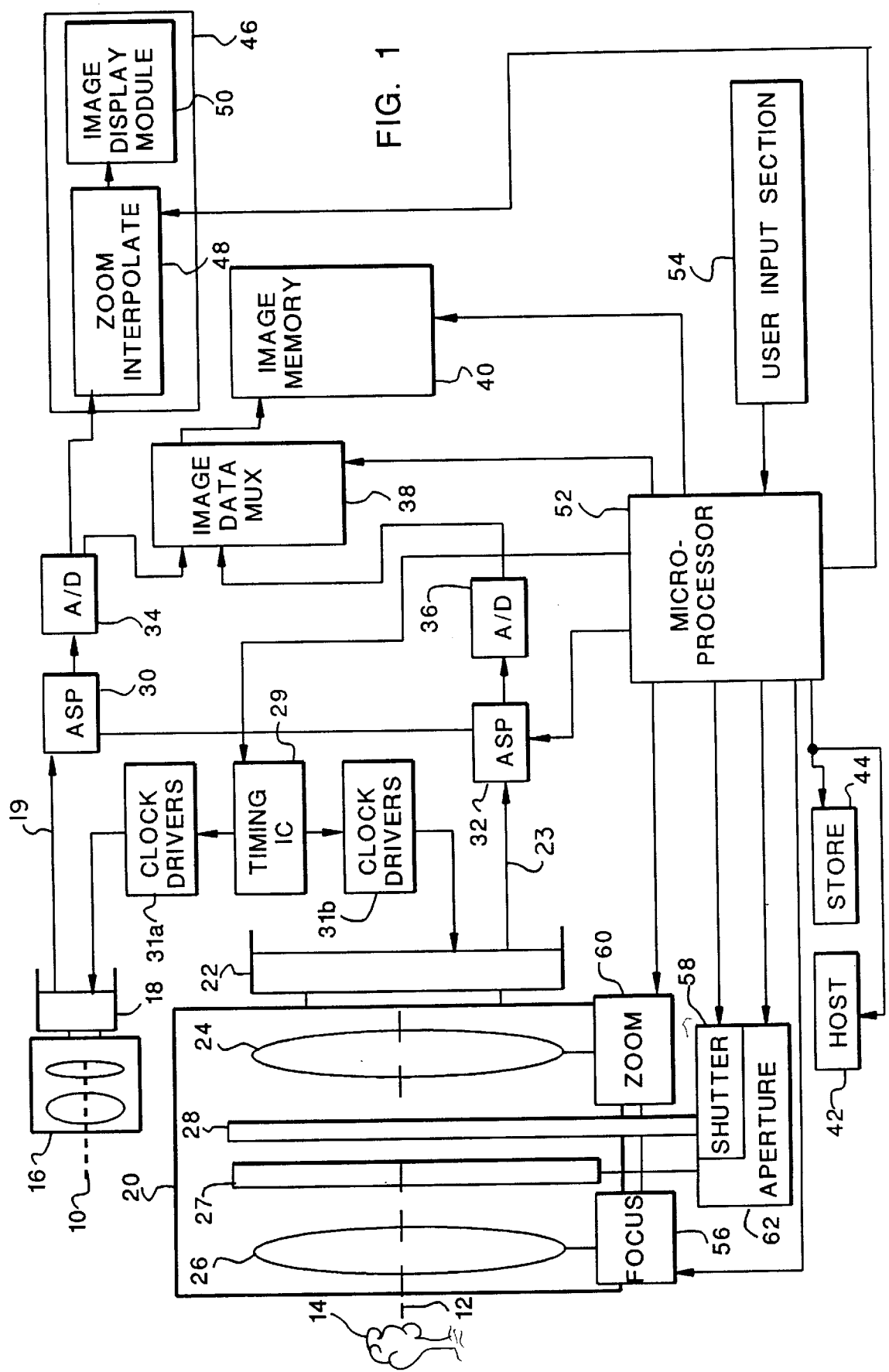
FIG. 1 is a block diagram of a dual sensor camera according to the invention showing separate optical paths for the two sensors.

Referring first to FIG. 1, a dual sensor electronic camera is shown with two optical paths according to the invention—a viewfinder optical path 10 and an imaging optical path 12. In the viewfinder optical path 10, image light from a subject 14 is directed by a viewfinder optical section 16 upon a first image sensor 18, preferably a charge coupled device (CCD) imager composed of a two-dimensional array of image pixels providing live resolution (motion-capable resolution), which, though it may be above or below video resolution, is typically a video resolution (i.e., about 480 lines). The image sensor 18 is responsive to image light from the subject 14 for generating a first output signal 19 that is used for camera control functions, such as image viewing, exposure control, white balance, and the like. In the imaging optical path 12, the image light is directed by an imaging optical section 20 upon a second image sensor 22, preferably a full frame or progressive scan high resolution (megapixel) CCD imager composed of a two-dimensional array of image pixels, such as Kodak model KAF-1600, which has 1536× 1024 pixels. The second image sensor 22 is responsive to image light for generating a second image signal that is used to produce a second output signal 23. Because the second image sensor 22 has a higher resolution than the first image sensor 18, the first image sensor will be hereinafter referred to as the low resolution sensor 18 and the second image sensor as the high resolution sensor 22. The imaging optical section 20 includes variable focal length zoom elements 24, a focusing element 26, an optical aperture element 27, and an optical shutter 28. (As for shuttering, the image sensor 22 could alternatively be electronically shuttered). Each element depends upon external settings, such as a zoom setting from the camera user.

A timing IC 29 provides timing signals to clock drivers 31a and 31b, which in turn provide the clock signals that initiate and drive the clocking of the image sensors 18 and 22, thereby producing the first and second output signals, 19 and 23 respectively corresponding to pixel image data from the respective sensor. The pixel image data is output to the analog signal processing sections 30 and 32 and converted into low resolution and high resolution digital image data by first and second analog-to-digital (A/D) converters 34 and 36. Although the first low resolution sensor 18 and the second high resolution sensor 22 both require A/D conversion, the actual converters may be different devices, i.e., different parts offering different numbers of bits per sample, for example, 8 bits for low resolution and 12 bits for high resolution. The outputs from the A/D converters 34 and 36 are applied to an image data multiplexer 38, which multiplexes the digital image data to an internal image memory 40. The image data can then be downloaded directly to a host computer 42 through an appropriate interface, or applied to a removable storage device 44, such as a memory card, magnetic tape, optical disk, or the like, through, if necessary, an appropriate write device (magnetic head, optical head, etc.).

Meanwhile, the low resolution image data from the A/D converter 34 is applied to an image viewing section 46, which includes a zoom interpolator 48 and an image display (viewfinder) module 50. The display module 50 includes a display device, preferably a liquid crystal display (LCD), and a display driver device (both devices not shown separately). The display module 50 receives image data from the zoom interpolator 48 and manages the actual display driver, which could be a direct digital LCD drive or an NTSC video drive system providing standard analog video signals. In either case, this display may be used both to preview images before capture and to verify the image captured as to the correct exposure and zoom requested. The zoom interpolator 48 processes the low resolution image signal so that the size of a display image provided by the image display module 50 corresponds to the zoom setting of the imaging optical section 20.

A camera microprocessor 52 controls most of the camera functions shown in FIG. 1, including initiating sensor clocks, timing sequences, and control logic; synchronizing the high resolution and low resolution imager clocks with output images; and transferring image data through the image data multiplexer 38 into the image memory 40. More specifically, the microprocessor 52 interacts with the timing IC 29 to synchronize the low resolution image from the sensor 18 and the high resolution image from the sensor 22. This assures that the low resolution image is captured at the same time as the high resolution captured image. In order for the user to verify that the exposure was correct for the high resolution image, it is necessary that the viewfinder image be captured at the same time, displaying the same scene. The microprocessor 52 also receives user settings from a user input section 54 and provides for lens control functions by means of a focus controller 56, a shutter controller 58, a zoom controller 60, and an aperture controller 62, all connected to the imaging optical section 20. The microprocessor 52 also may control the digital drive LCD in image module display 50 directly, eliminating the need for additional LCD drive electronics. (This would not provide the NTSC standard video output however.)

The microprocessor 52 also controls the transfer of image data into the image memory 40 by manipulation of the image data multiplexer 38. Besides providing a manageable image transfer path by jointly gating the output of the low resolution viewfinder optical path 10 and the high resolution imaging optical path 12, the multiplexer 38 allows the microprocessor 52 to match low resolution motion segments with a high resolution image segment. In order to assure that a specific number or time increment of low resolution images (frames) are captured before and after the high resolution image (frame), sensor exposure times are controlled by the timing IC 29 so that leading and trailing low resolution images are matched to the high resolution still capture. In one implementation, the multiplexer 38 may be comprised of two first-in-first-out (FIFO) memories. One FIFO would be devoted to each image, and sized to store at least one line from the image. The FIFOs can share an internal bus with the microprocessor 52, and can be controlled so that the high resolution still image can be read out from the imager 22 over a long time interval (because of the large amount of data in the image) while a series of low resolution images are also read out from the imager 18.

Once the image data is stored in the image memory 40, the microprocessor 52 can perform additional processing on the data, e.g., file formatting (TIFF, PICT, etc.), compression, manipulation, or the calculation of statistics for exposure control, white balance, etc. The microprocessor 52 also receives input and settings from the user input section 54, which is part of the camera user interface. Specifically, the user input section 54 includes controls for selecting an exposure mode, for initiating a shutter release, and for allowing the user to zoom the zoom elements 24 in or out by pressing buttons or switches. The microprocessor 52 connects to the focus controller 56, shutter controller 58, zoom controller 60, and aperture controller 62 to control motors and actuators that drive the zoom, focus, shutter speeds, and the aperture position.

In one implementation, the viewfinder optical section 16 is a low cost fixed focal length (non-zooming), focus-free lens. This optical section provides a live image to the low resolution image sensor 18. This low resolution image is digitally zoomed to match the user selected zoom (from the user input section 54) and the image taking zoom position. In contrast, the imaging optical section 20 includes a high quality zoom lens that is designed to support imaging by the high resolution sensor 22. The focal length (zoom position) is controlled by the zoom controller 60 to meet the user selected input from the user input section 54. Preferably, the high quality zoom lens is only used for the high resolution (still) image obtained from the high resolution (megapixel) sensor 22.

The low resolution sensor 18 is a low resolution (video or less) live-scene capable sensor. Besides supplying the live image for the image display module 50, the low resolution sensor 18 can optionally supply motion segments for storage surrounding (i.e., leading and trailing) the final high resolution image. Under control of the microprocessor 52, these segments are transferred through the multiplexer 38 to the image memory 40, and thereby saved with the high resolution image. Furthermore, the initial low resolution motion images from the low resolution sensor 18 can be used to determine exposure based upon scene data, that is, to determine the correct exposure based upon the scene light level and sensor image speed (ISO) rating. Using information from the low resolution sensor, the microprocessor 52 drives the shutter controller 58 and aperture controller 62 to set the correct shutter speed and aperture (for a given ISO, which is known to the microprocessor 52). If the low resolution sensor 18 is a color sensor (having a color filter array), these live images can also be used for auto white balance of the output image signal from the high resolution sensor 22.

Besides controlling the zoom setting and the focus position of the imaging optical section 20, based upon focal length changes from the user input section 54, the microprocessor 52 also sets the zoom interpolator 48 for appropriate digital zooming of the low resolution display on the image display module 50. The microprocessor 52 translates the user requested focal length information from the user input section 54 into a zoom factor which is supplied to the zoom interpolator 48. The interpolator then performs pixel subsampling on the low resolution image data in order to digitally zoom the displayed data. The interpolator then drives the LCD display in the image display module 50 with the new image. The interpolator pixel subsample operation could be a very simple function, since the quality of a small LCD display would not warrant complex interpolation of the image data. For example, a 2× zoom would require a simple ½ subsampling of each red, green, and blue pixel. The resultant image data would be reduced by ½, but zoomed by 2× to fill the display. Many other conventional digital zoom techniques are known from the prior art; see for example, the digital zooming techniques described in U.S. Pat. Nos. 4,963,981; 5,243,433; 5,333,055; and 5,339,105.

In practice, the zoom interpolation could be handled in a number of ways by hardware or software. A programmable device (FPGA, i.e., a field programmable gate array) could be programmed by the microprocessor 52 and perform all pixel subsampling and LCD control. Alternatively, the microprocessor 52 could perform the entire function—subsampling and LCD control—in software. Compared to a programmable device, this may place some additional requirements on the LCD display controller in order to maintain an acceptable display pace and microprocessor load. Another possibility is that an application specific integrated circuit (ASIC) could be developed to perform this function.

By pressing a zoom switch in the user input section 54, the user expects to see the image on the image display module 50 zoom in or out. The microprocessor 52 receives the user's input (zoom setting) and sets up the zoom interpolator 48 to correctly display the image on the LCD/viewfinder for this zoom setting. It will also control the image-taking lens 20 to track along with the desired zoom, although the user is not looking at any data through this optical path, or from this sensor, until the final image is captured. Consequently, another benefit of this architecture is that the image taking high resolution lens can be tracked along with the desired zoom either in real time or only when the user wants to capture an image. This provides alternatives for power management versus performance tradeoffs. For example, to save on battery power, the image-taking lens may not be moved at all until immediately before the user wants to capture the final high resolution image. This saves battery power during a user "hunt" from telephoto to wide angle and back finding a desirable zoom position.

Figure 2:
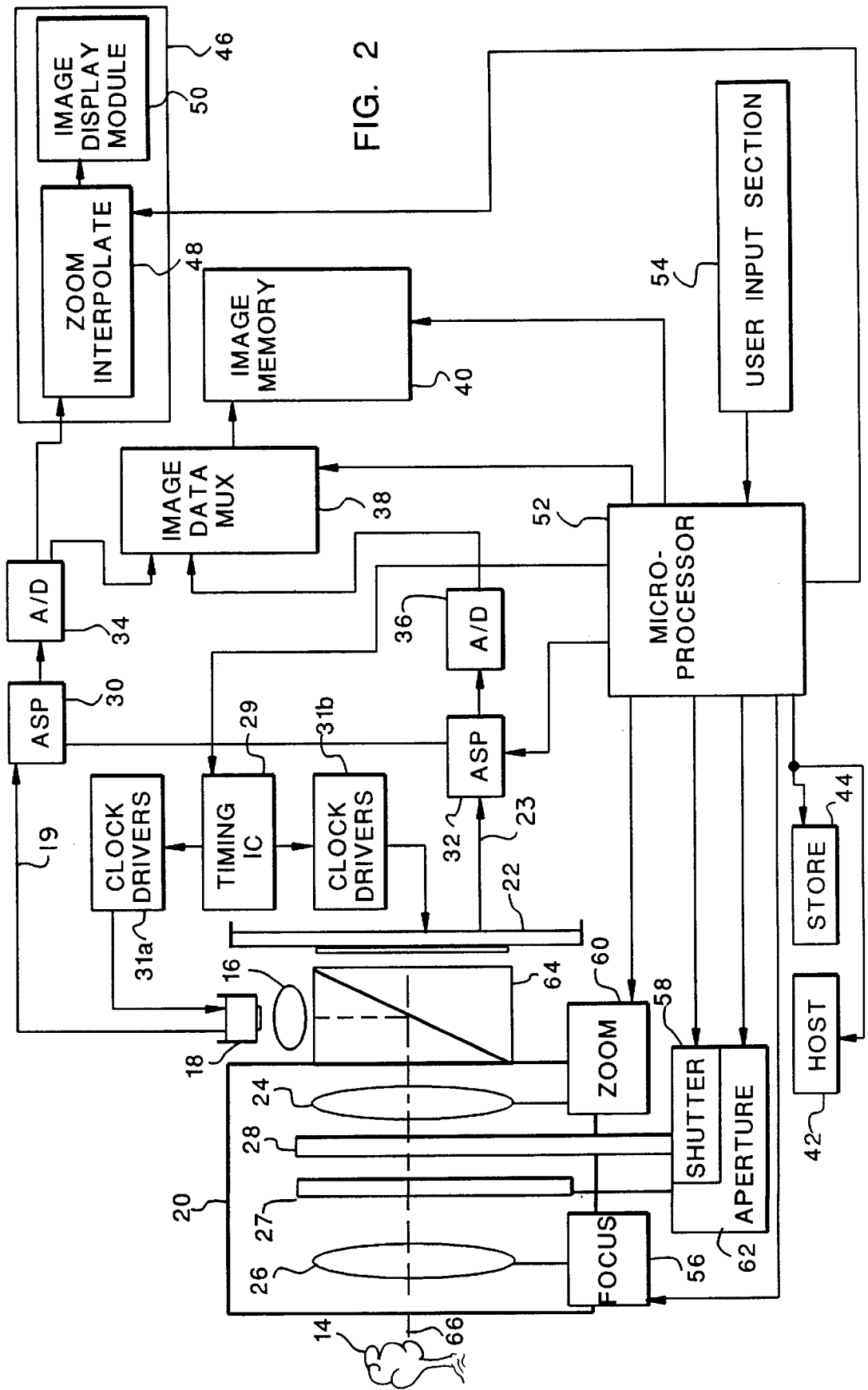
FIG. 2 is a block diagram of a dual sensor camera according to the invention showing a beamsplitter for directing light toward the two sensors.

Referring next to FIG. 2, an image beamsplitter 64 is inserted between the imaging optical section 20 and the high resolution sensor 22. Light in the main optical path 66 is then split by the beamsplitter 64 into two paths, one path directly through to the high resolution sensor 22 and the other path reflected to the low resolution sensor 18. Consequently, the high quality zoom lens in the optical section 20 supports both sensors, and the same image falls on both sensors at the same time. If the active areas of the sensors 18 and 22 are of different size, the optical construction of the beamsplitter 64 can include additional optical elements to correct for this and correctly size the images being split off to the respective sensors. As in the embodiment shown in FIG. 1, the focal length (zoom position) is controlled from the user input section 54 to meet the user selected input.

In addition to the display/viewfinder and other camera functions described in connection with FIG. 1 (exposure, metering, and white balance), the implementation shown in FIG. 2 allows the low resolution sensor 18 to provide through-the-lens (TTL) autofocus. By capturing scene data directly through the zooming imaging optical section 20, data from, e.g., selected area(s) of the low resolution sensor 18 may be used to determine focus through a conventional contrast autofocus algorithm. Correction can then be performed by the microprocessor 52 driving the focus controller to move the variable focusing element 26. With the correct lens calibration or tolerance, the autofocus data can also be used for autoranging. In other words, once the image is in focus, the position of the focusing mechanism may be correlated to subject range data, and then used for such other functions as flash quench. Besides offering autofocus and autoranging, the utilization of a beamsplitter reduces the complexity of the optics and image alignment, and takes up less space in the camera. In addition, this arrangement eliminates parallax (pointing) errors between the sensors.

As shown in connection with FIG. 1, the low resolution image sensor 18 is able to provide a user-selected zooming image through the imaging optical section 20 without varying the focal length. To do this in connection with the embodiment shown in FIG. 2, the zoom controller 60 would set the variable focal length zoom elements 24 at wide angle, and the user-viewed zooming on the image display module 50 would be performed digitally by the zoom interpolator 48. This allows very rapid scanning of the scene at varying focal lengths, without having to wait for mechanical adjustment of the optical section 20. Just before the user commands the camera (through the user input section 54) to take a final high resolution image, the microcomputer 52 drives the zoom controller 60 to set the zoom elements 24 to the last selected zoom setting. The signal to make this final zoom setting could be provided by an additional electrical position on the capture switch, which triggers just before the image is taken (commonly called a soft-press on many cameras). The resulting captured image will match the high resolution image with the user's desired image as seen on the image display module 50.

The invention has been described with reference to a preferred embodiment. However, it will be appreciated that variations and modifications can be effected by a person of ordinary skill in the art without departing from the scope of the invention.

PARTS LIST 10 viewfinder optical path
12 imaging optical path
14 subject
16 viewfinder optical section
18 first image sensor 20 imaging optical section
22 second image sensor
24 variable focal length zoom elements
26 focusing element
27 optical aperture element
28 optical shutter
29 timing IC
30 first analog signal processing section
31a,b clock drivers
32 second analog signal processing section
34 first A/D converter
36 second A/D converter
38 image data multiplexer
40 internal image memory
42 host computer
44 removable storage device
46 image viewing section
48 zoom interpolator
50 image display module
52 microprocessor
54 user input section
56 focus controller
58 shutter controller
60 zoom controller
62 aperture controller
64 image beamsplitter
66 main optical path
68 film mechanism
70 photographic film
72 motor
74 computer/monitor jack

I claim:

1. An electronic camera for capturing and processing data relating to an image in order to produce an output image signal, said camera comprising:

a first image sensor responsive to image light for generating a first output signal that is used for camera control functions;

a second image sensor responsive to image light for generating a second output signal that is used to produce the output image signal, wherein the second image sensor has a higher resolution than the first image sensor;

a zoom lens for varying the size of the image incident upon the second image sensor; and a zoom interpolator responsive to a zoom setting of the zoom lens;

wherein the first output signal from the first image sensor is applied to the zoom interpolater, which processes the first output signal to correspond spatially to the image represented by the send output signal.

2. An electronic camera as claimed in claim 1 wherein the control function is image viewing and the camera further includes an electronic display, and the first output signal from the first image sensor is applied to the electronic display to generate a display image for image viewing.

3. An electronic camera as claimed in claim 1 wherein the camera includes an exposure control section for controlling exposure of the second image sensor, and the first output signal from the first image sensor is applied to the exposure control section for controlling exposure.

4. An electronic camera as claimed in claim 1 wherein the camera includes an automatic white balance section that operates on the second output signal from the second sensor, and the first output signal from the first image sensor is applied to the automatic white balance section for obtaining automatic white balance.

5. An electronic camera as claimed in claim 1 wherein the image light is separately directed to the first and second image sensors through respectively separate first and second optical paths including separate optical sections.

6. An electronic camera as claimed in claim 1 wherein the camera includes a main optical assembly for directing image light through a main optical path, and a beamsplitter positioned to receive the image light from the main optical path and split the image light into first and second light paths directed to the respective image sensors.

7. An electronic camera for capturing and processing data relating to an image, said camera comprising:

a first image sensor responsive to image light for generating a first output signal that is used for generating a low resolution thumbnail image;

a second image sensor responsive to image light for generating a second output signal that is used for generating a high resolution still image, wherein the second image sensor has a higher resolution than the first image sensor;

means for synchronizing the image sensors so that the low resolution thumbnail image corresponds to the high resolution still image;

a zoom lens for varying the size of the image incident upon the second image sensor; and a zoom interpolator rest of the zoom lens;

wherein the first output signal from the first image sensor is applied to the zoom interpolator, which processes the first output signal to correspond spatially to the image represented by the second output signal.

8. An electronic camera for capturing data relating to an image through dual optical paths having separate optical systems, said camera comprising:

a first image sensor situated in a first optical path for generating a first output signal that is used for camera control functions;

a second image sensor situated in a second optical path for generating a second output signal that is used for imaging functions, wherein the second image sensor has a higher resolution than the first image sensor; and a zoom lens in the second optical path and a digital zoom interpolator responsive to a zoom setting of the zoom lens;

wherein the first output signal from the first image sensor is applied to the zoom interpolator so that a zoom ratio of a display image obtained from the first output signal matches the zoom setting of the zoom lens.

9. An electronic camera as claimed in claim 8 wherein the camera further includes an electronic display, and the first output signal from the first image sensor is applied to the electronic display to generate a display image.

10. An electronic camera as claimed in claim 8 wherein the camera includes an exposure control section, and the first output signal from the first image sensor is applied to the exposure control section for exposure control.

11. An electronic camera as claimed in claim 8 wherein the camera includes an automatic white balance section, and the first output signal from the first image sensor is applied to the automatic white balance section for performing automatic white balance.

12. An electronic camera for capturing and processing data relating to an image, said camera comprising:

a first image sensor responsive to image light for generating a first output signal that is used for generating a low resolution image;

a second image sensor responsive to image light for generating a second output signal that is used for generating a high resolution still image, wherein the second image sensor has a higher resolution than the first image sensor;

means responsive to the first output signal for generating a sequence of low resolution images comprising a motion segment immediately before, during, and after the captured high resolution still image;

a zoom lens for varying the size of the image incident upon the second image sensor; and a zoom interpolator responsive to a zoom setting of the zoom lens;

wherein the first output signal from the first image sensor is applied to the zoom interpolator, which processes the first output signal to correspond spatially to the image represented by the second output signal.

13. An electronic camera as claimed in claim 12 wherein the motion segment includes several frames leading and several frames trailing the high resolution still image, along with a frame corresponding to the high resolution still image.

14. An electronic camera for capturing and processing data relating to a sequence of images, said camera comprising;

a first low resolution image sensor responsive to image light for generating a first output signal that is used for generating a motion image display relating to the sequence of images;

a second high resolution image sensor responsive to image light for generating a second output signal that is used to produce an output image signal relating to a selected still image from the sequence of images;

an image storage device;

means for driving the high resolution image sensor to capture the selected still image;

means for storing the selected still image captured by the high resolution image sensor and at least some of the images from the sequence of images captured by the low resolution sensor;

a zoom lens for varying the size of the image incident upon the second image sensor; and a zoom interpolator responsive to a zoom setting of the zoom lens;

wherein the first output signal from the first image sensor is applied to the zoom interpolator, which processes the first output signal to correspond spatially to the image represented by the second output signal.

15. An electronic camera as claimed in claim 14 in which the sequence of images captured and stored from the low resolution image sensor include the images immediately leading and trailing the selected still image.

16. A method of capturing and processing data relating to an image in order to produce an output image signal, said method comprising the steps of:

exposing a low resolution image sensor to image light to generate a first output signal;

exposing a high resolution image sensor to image light to generate a second output signal that is used to produce the output image signal;

generating a display image from the first output signal;

inputting a zoom setting indicative of the amount of image zoom required for the output image signal; and digitally processing the first output signal with a zoom interpolator, which processes the first output signal to correspond spatially to the image represented by the second output signal, to vary the size of the display image reproduced therefrom in order to match the zoom setting.

17. A method for capturing and processing data relating to an image in order to produce an output image signal, said method comprising the steps of:

exposing a low resolution image sensor to image light to generate a first output signal;

providing an optical path with zooming optics;

exposing a high resolution image sensor to image light in the optical path to generate a second output signal that is used to produce the output imaging signal;

generating a display image from the first output signal;

inputting a zoom setting indicative of the amount of image zoom required for the output image signal;

digitally processing the first output signal with a zoom interpolator, which processes the first output signal to correspond spatially to the image represented by the second output signal, to vary the size of the display image reproduced therefrom in order to match the zoom setting;

generating a capture signal when the image is to be captured; and driving, in response to the capture signal, the zooming optics to the amount of zoom required by the zoom setting.

18. A method as claimed in claim 17 wherein the step of digitally processing the first output signal to vary the size of the display image reproduced therefrom in order to match the zoom setting is continually performed during a view-finding process, and wherein the step of driving, in response to the capture signal, the zooming optics to the amount of zoom required by the zoom setting is performed just prior to the moment of image capture.

19. An electronic camera having an electronic display for capturing and processing data relating to an image in order to produce an output image signal, said camera comprising:

a first image sensor responsive to image light for generating a first output signal that is applied to the electronic display to generate a display image for image viewing;

a second image sensor responsive to image light for generating a second output signal that is used to produce the output image signal, wherein the second image sensor has a higher resolution than the first image sensor;

a zoom lens for varying the size of the image incident upon the second image sensor; and a zoom interpolator responsive to a zoom setting of the zoom lens;

wherein the first output signal from the first applied to the zoom interpolator, which processes the first output signal to correspond spatially to the image represented by the second output signal.

* * * * *

UNITED STATES PATENT AND TRADEMARK OFFICE
CERTIFICATE OF CORRECTION

PATENT NO. : 5,926,218
DATED : July 20, 1999
INVENTOR(S) : Stephen P. Smith

It is certified that error appears in the above-identified patent and that said Letters Patent is hereby corrected as shown below:

| | |
|---|---|
| Column 8, claim 7, line 27 | "a zoom interpolator rest of the zoom lens;" should read --a zoom interpolator responsive to a zoom setting of the zoom lens;-- |
| Column 10, claim 19, line 59 | "wherein the first output signal from the first applied to the" should read --wherein the first output signal from the first image sensor is applied to the--. |

Signed and Sealed this

Seventh Day of December, 1999

Attest:

Q. TODD DICKINSON

*Attesting Officer*   *Acting Commissioner of Patents and Trademarks*